United States Patent [19]

Singer

[11] Patent Number: 5,634,116
[45] Date of Patent: May 27, 1997

[54] NON-INTEGER MULTIPLE CLOCK TRANSLATOR

[75] Inventor: Bruce W. Singer, Richmond, Vt.

[73] Assignee: International Business Machines Corporation, Armonk, N.Y.

[21] Appl. No.: 413,641

[22] Filed: Mar. 30, 1995

[51] Int. Cl.$^6$ .................................................. G06F 1/12
[52] U.S. Cl. .................................................. 395/551
[58] Field of Search ...................... 395/550; 375/354; 327/141, 144, 145

[56] References Cited

U.S. PATENT DOCUMENTS

| | | |
|---|---|---|
| 4,021,784 | 5/1977 | Kimlinger . |
| 4,098,588 | 7/1978 | Buswell et al. . |
| 4,649,539 | 3/1987 | Crain et al. . |
| 4,701,921 | 10/1987 | Powell et al. . |
| 4,710,931 | 12/1987 | Bellay et al. . |
| 4,710,933 | 12/1987 | Powell et al. . |
| 4,771,441 | 9/1988 | Spengler et al. ............... 375/145 X |
| 4,949,361 | 8/1990 | Jackson ............... 375/371 |
| 5,369,672 | 11/1994 | Matsumoto ............... 375/354 |
| 5,487,092 | 1/1996 | Finney et al. ............... 375/354 |

FOREIGN PATENT DOCUMENTS

| | | |
|---|---|---|
| 0375794A1 | 7/1990 | European Pat. Off. . |
| 2262415 | 6/1993 | United Kingdom . |
| WO94/04973 | 3/1994 | WIPO . |

OTHER PUBLICATIONS

Intel Pentium Reference Manual, Chapter 19.
E.N. Hayes, et al. "Synchronization of LSSD System Clocks to Asynchronous Signals", IBM Technical Disclosure Bulletin, vol. 27, No. 8, Jan. 1985, pp. 4934–4936.

*Primary Examiner*—Thomas M. Heckler
*Attorney, Agent, or Firm*—Lawrence H. Meier; Anthony J. Dillon

[57] ABSTRACT

A multiple clock translator for a microprocessor is provided for synchronizing data from an external clock speed to an internal clock speed that is a non-integer multiple of the external clock speed. The translator comprises a latch circuit and a synchronization signal generator. The latch circuit receives data at the external clock speed and outputs data at the internal clock speed. The latch circuit includes an input latch and a sync latch, and receives an external clock having an enabling phase and an internal clock having an enabling phase. The input latch is docked by the enabling phase of the external clock, and the sync latch is docked by the enabling phase of the internal clock and enabled by a sync pulse. The synchronization signal generator generates a series of sync pulses that are output to the latch circuit in a selected pattern, wherein the pattern is a function of the non-integer multiple.

12 Claims, 5 Drawing Sheets

Fig. 1

2.5X clocking mode

2.5X clocking mode

Preload Count Logic

Fig. 7

NON-INTEGER MULTIPLE CLOCK TRANSLATOR

BACKGROUND OF THE INVENTION

1. Technical Field

The present invention relates in general to clock translators and in particular to clock translators for microprocessors. Still more particularly, the present invention relates to non-integer multiple clock translators for microprocessors.

2. Description of the Related Art

In modern personal computers (PCs), PC computer boards typically have a transmission speed limitation that is less than the PC's microprocessor speed. Cost considerations have prevented the PC board from being made faster. Instead, the speed of the PC computer system has been increased by speeding up the microprocessor and providing internal cache memory to the processor, decreasing the bandwidth required of the system bus. Thus, data being transferred over the bus on the PC computer board is timed by a bus clock having a speed limitation of, for example, 66 Mhz, while the processor is operating at a speed of, for example, 100 Mhz. Data being transferred from the PC board to the microprocessor would be delivered to a clock translator that synchronizes data from the bus with the faster processor clock and transfers it out to the processor. Therefore, in order to couple the faster processor with the slower PC board, the external clock on the PC board has to be synchronized with the internal system clock on the microprocessor.

In the prior art, the processor clock has typically been an integer (n) multiple of the external clock, typically two or three times faster. While the prior art has provided clock translators for operation with internal microprocessors that operate at nx integer multiples of the system bus speed, the prior art has heretofore not provided a clock translator capable of operating with a system microprocessor that operates at both an integer and a non-integer multiple of clock frequencies. Thus, it would be desirable to provide a multiple clock translator that translates data to a non-integer multiple clock frequency.

SUMMARY OF THE INVENTION

According to the present invention, a multiple clock translator for a microprocessor is provided for synchronizing data from an external clock speed to an internal clock speed that is a non-integer multiple of the external clock speed. The translator comprises a latch circuit and a synchronization signal generator. The latch circuit receives data at the external clock speed and outputs data at the internal clock speed. The latch circuit includes an input latch and a sync latch, and receives an external clock having an enabling phase and an internal clock having an enabling phase. The input latch is clocked by the enabling phase of the external clock, and the sync latch is clocked by the enabling phase of the internal clock and enabled by a sync pulse. The synchronization signal generator generates a series of sync pulses that are output to the latch circuit in a selected pattern, wherein the pattern is a function of the non-integer multiple.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
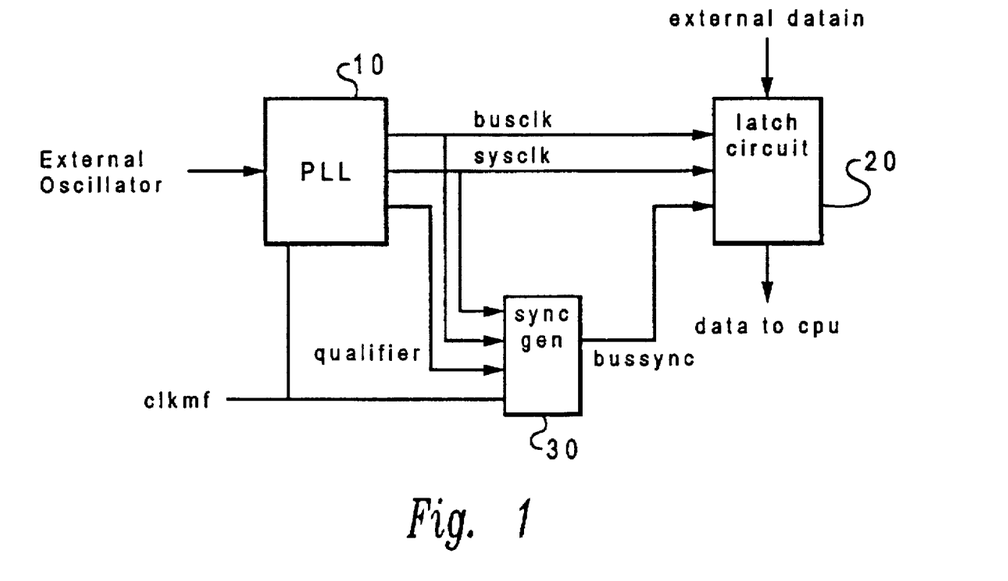
FIG. 1 depicts the clock translator, in accordance with a preferred embodiment of the present invention.

With reference now to the figures and in particular with reference to FIG. 1, there is depicted the clock translator of a preferred embodiment of the present invention. "busclk" and "sysclk" are internally distributed processor clocks derived from the phase lock loop (PLL) circuit 10, which is triggered with an external oscillator. busclk clocks data at the bus I/O of the microprocessor at the system bus speed. sysclk is the processor core clock and sets the internal logic cycle time. busclk is a two phase clock with busclk phase 1 (busclk P1) being the up level and busclk phase 2 (busclk P2) being the down level. (See FIGS. 2 and 3) sysclk is divided in the same way into sysclk phase 1 and sysclk phase 2.

Latch circuit 20 receives external data from the PC board over a system bus operating at the external clock frequency of the computer system (i.e. the frequency of busclk). busclk and sysclk are input into latch circuit 20, along with the bussync signal from sync generator 30. Latch circuit 20 synchronizes the input external data with sysclk in response to the bussync signal, and outputs the data to the central processing unit at the faster internal clock frequency.

According to the present invention, the clock translator allows the synchronization of the external data, which has been latched in latch circuit 20 at the external clock frequency, to the internal processor speed, even if the internal clock frequency is a non-integer multiple of the external clock frequency. A non-integer multiple is one which has a non-zero fraction. (Conversely, an integer multiple is an integer number with a zero fraction. For example, integer numbers include 1, 2, 3, 4 . . . etc.) In other words, for sysclk to be a non-integer multiple of busclk, sysclk cannot be an integer number of times faster than busclk. (So, for example, sysclk=3½× busclk.) For illustrative purposes, the present invention will be described in a preferred embodiment of a 2.5× multiple clock translator. Although the present invention will be described for system having a system clock operating at 2.5× that of the external clock, it will be appreciated that the present invention may be practiced using an internal clock frequency that is any non-integer or integer multiple of the external clock frequency.

Figure 2:
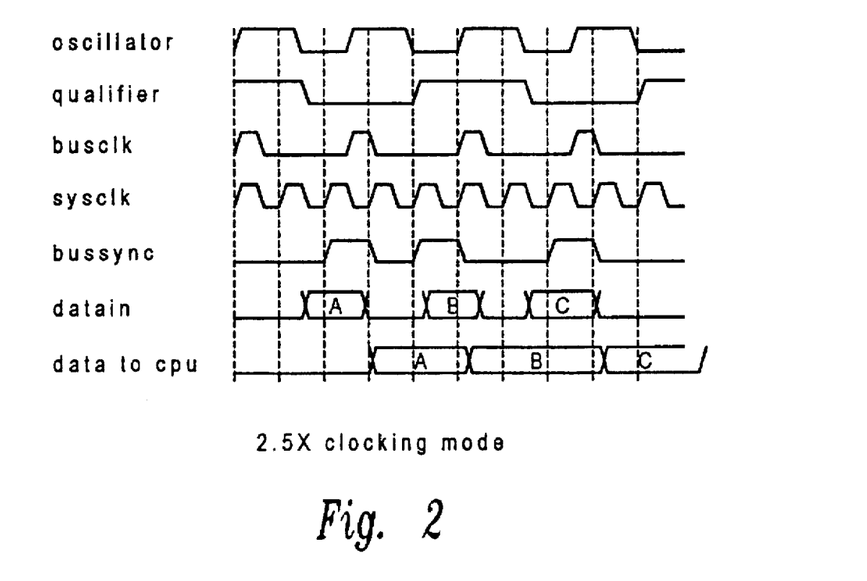
FIG. 2 is a timing diagram for a preferred embodiment of the clock translator of the present invention shown in FIG. 1.

With reference now to FIG. 2, there is depicted a timing diagram for a preferred embodiment of the clock translator of the present invention shown in FIG. 1, where the frequency of sysclk is 2½ times busclk. The "qualifier" signal from the PLL 10 indicates the phase relationship of busclk and sysclk. A logic "1" indicates sysclk is in phase with busclk. For ½× multiples, the qualifier signal will toggle every other cycle of busclk. For other multiples, the PLL 10 can be designed to produce the qualifier at each cycle of the busclk that is synchronized with the sysclk, which can be determined mathematically as a function of the multiple, as will be appreciated by those skilled in the art.

External data transferred on the system bus at the external frequency is captured and latched into latch circuit 20 by the clocking of busclk. Latch circuit 20 transfers the latched data to the CPU core when the data is synchronized with sysclk. Sync generator 30 provides the "bussync" signal that allows the synchronization of the latched data with the internal processor speed, even if the internal clock frequency is a non-integer multiple of the external clock frequency. Sync generator 30 creates the bussync signal to properly control when external data latched in latch circuit 20 can be transferred to the CPU.

The "clkmf" input to PLL 10 and sync generator 30 is a 4-bit input which is encoded for the multiplication frequency (i.e. the non-integer multiple) of sysclk. Because the clock translator of the present invention can perform data clock translations for either integer or non-integer multiples, the ½ n× multiple clock translator of the preferred embodiment provides sixteen possible translations from a 1× multiple to an 8× multiple (i.e. 1×, 1.5×, 2×, 2.5×, 3×, 3.5×, 4×, . . . 8×). The encoded four bits indicates to the sync generator 30 how to generate the bussync for the various modes, as will be described herein below.

Figure 3:
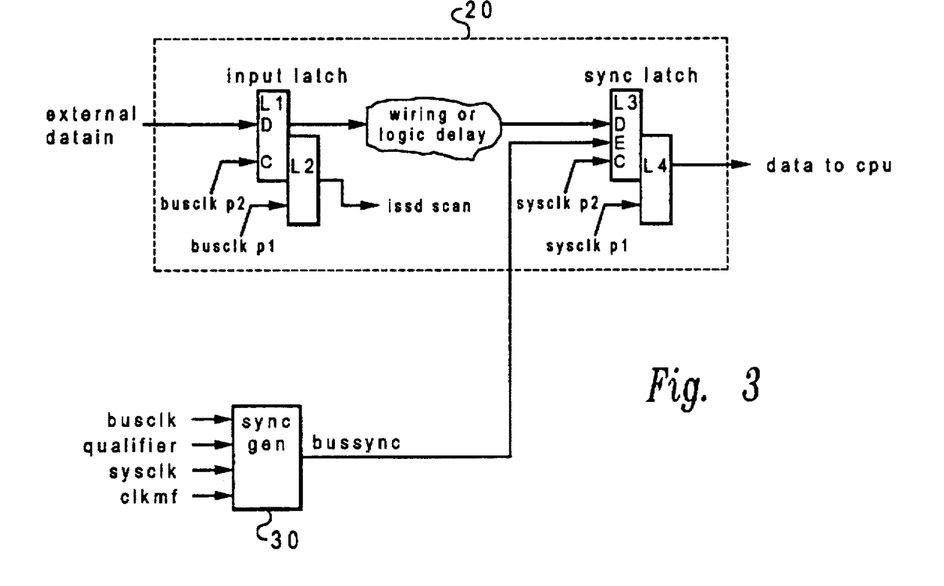
FIG. 3 depicts a more detailed schematic block diagram of latch circuit and the sync generator, in accordance with a preferred embodiment of the present invention.

Referring now to FIG. 3, there is depicted a more detailed schematic block diagram of latch circuit 20 and sync generator 30. Latch circuit 20 includes an input latch and a sync latch. Both latches are a master-slave type, wherein the input latch comprises latches L1 and L2, and the sync latch comprises latches L3 and L4. All four latches are level sensitive scan devices (LSSD) with the "master" (L1 and L3) latch clocked with phase 2 and the "slave" (L2 and L4) latch clocked with phase 1.

External data transferred on the system bus at the external frequency is captured and latched into latch circuit 20 by the clocking of busclk. "External datain" has a setup and hold specification with respect to the busclk rising edge. The external datain is input to input latch L1. While busclk phase 2 is active, data out of input latch L1 will follow the external datain. During the period that busclk P2 is active, input latch L1 is transparent and the external datain passes through the input latch and is presented to the sync latch L3. bussync is used to enable the sync latch L3 at the closest sysclk rising edge to a busclk rising edge. All other edges of sysclk will be disabled from the latch. On the rising edge of busclk (end of busclk P2), data is latched in input latch L1. This data is latched in input latch L1 until busclk P2 is active again in the next bus cycle. During the phase that busclk P1 is active, input latch L2 is transparent and the latch data of input latch L1 is output as LSSD scan. The input latch L2 is used just for LSSD scan, as will be appreciated by those skilled in the art.

Figure 4:
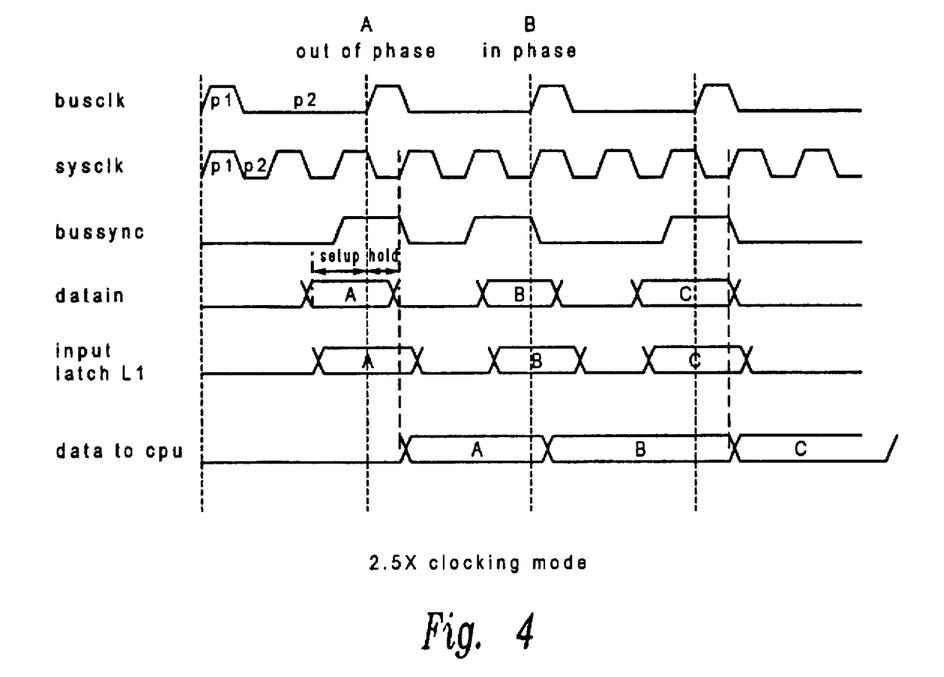
FIG. 4 is a timing diagram of the 2.5× clocking mode of a preferred embodiment of clock translator of the present invention.

Referring now to FIG. 4, there is shown a timing diagram of the 2.5× clocking mode of a preferred embodiment of the clock translator of the present invention. Referring first to the time line B, there is shown "in phase" timing, as it occurs in the clock translator of the present invention. At this time line B, busclk and sysclk are active in the enabling phase P2. Also, bussync, which is a series of pulses having its up (high) level as its enabling phase, is also active.

As can be seen in FIG. 3, the datain "B" will pass through input latch L1, which is transparent during the active phase of busclk P2, and into the input of sync latch L3, during this time line. sysclk P2 and bussync, being active, allow the flushed external data to be clocked into sync latch L3. On the rising edges of busclk and sysclk (end of enabling phase P2), the external data is latched into both input latch L1 and sync latch L3. There is no clock edge dependency between busclk rising and sysclk rising edges to latch the external data into the sync latch. It can be seen that the latch data in sync latch L3 is immediately available to sync latch L4 when sysclk P1 becomes active at the top of the rising edge. At this point, L4 becomes transparent and the latch data "B" is output to the CPU. In the next P2 phase of sysclk, the data has been latched by sync latch L4 and is held as a stable output to the CPU, while the data in sync latch L3 is immune from changes on its data input because bussync has entered a disabling phase and has disabled the sync latch.

Referring again to FIG. 4, time line A shows the case of data capturing when busclk and sysclk are "out-of-phase" with each other, as will occur during certain busclk cycles when the sysclk is a non-integer multiple of the busclk frequency. On the rising edge of the busclk enabling phase P2 input latch L1 will latch in the external datain and will hold this data until busclk P2 is active again. During this P1 active phase, input latch L1 will provide stable data to sync latch L3. During this latching phase of input latch L1 (some time after time line A), sysclk P2 and bussync both attain an active phase, allowing sync latch L3 to sense the latch data output from input latch L1. This data is latched in sync latch L3 on the rising edge of sysclk (at the end of sysclk enabling phase) and, at the same time, is transferred from sync latch L3 to sync latch L4. The external datain is now synchronized with sysclk and it is output to the CPU.

It will be appreciated that when busclk and sysclk are in-phase, there is no latency penalty induced. However, when busclk and sysclk are out of phase, there is one sysclk phase sync-up latency.

As can be seen from the above description, the clock translator of the present invention synchronizes external data with the processor internal clock, even in cases where the processor clock is operating at a non-integer multiple of the external datain. Thus, the present invention can synchronize the input data with sysclk, whether or not the phase changes of the busclk are synchronized with the sysclk.

While the present invention can perform a clock translation for a pair of non-integer multiple clocks, there is a restriction on the timing. A busclk falling edge must not fall before a sysclk rising edge because the data out of the input latch L1 must maintain stable data to the sync latch L3 until the rising edge of sysclk. There is no clock edge dependency between busclk rising and sysclk falling edges. While FIG. 4 describes the theoretical operation of the clock translator of the present invention, an actual circuit will include wiring or logic delays that will effect the timing. Nonetheless, busclk rising can be before or after sysclk rising edges for the external datain to be latched into the sync latch. The constraints of this mode are the datain set up times, receiver and latch delays, logic and wiring delays, and sync latch set up times. Traditional static timing analysis can be used to verify path delays, as will be appreciated by those skilled in the art.

Figure 6:
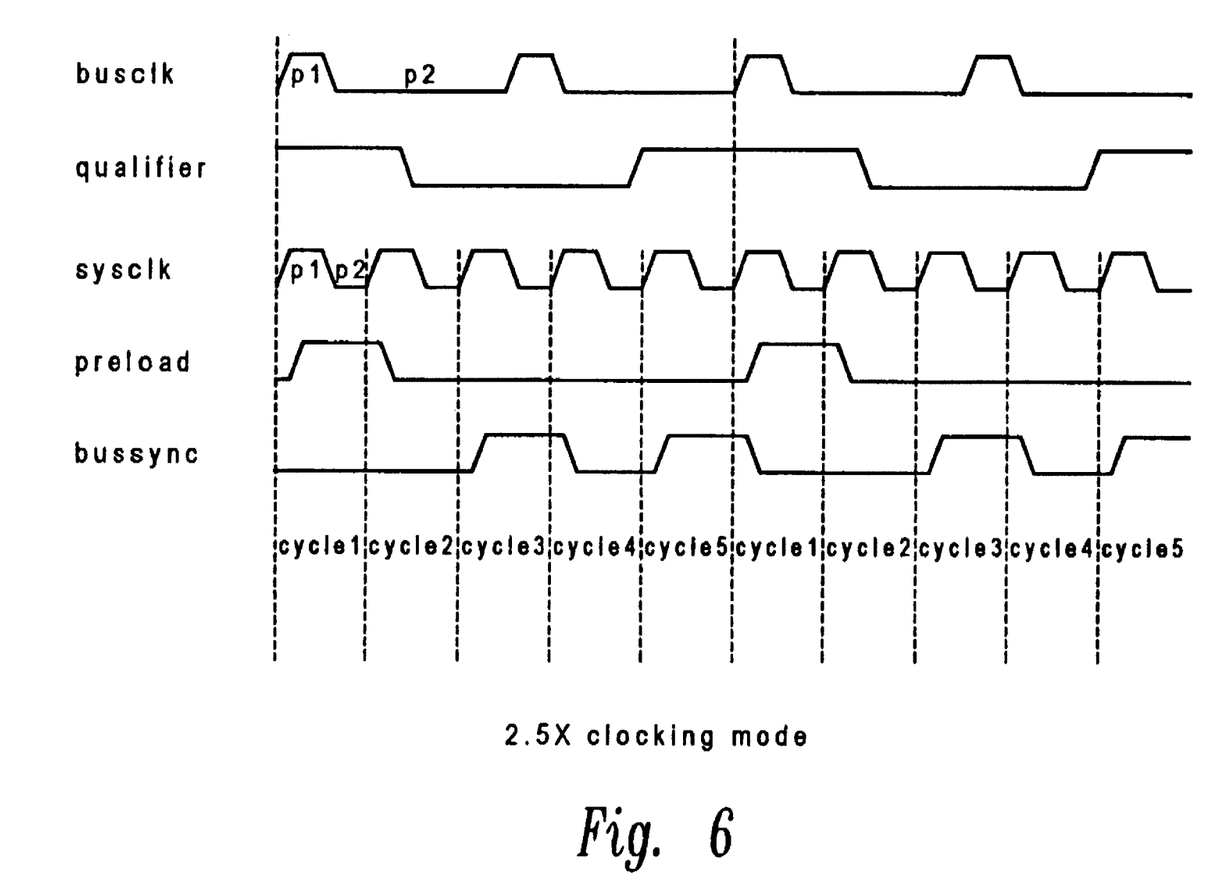
FIG. 6 depicts a timing diagram of the clocks input to the sync generator of a preferred embodiment of the present invention.

Referring to FIG. 6, there is depicted a timing diagram of the clocks input to sync generator 30. As has been explained, the qualifier signal is produced by PLL 10 as a function of the clock multiplication frequency (clkmf). The qualifier signal is preprogrammed to toggle between an enabling signal, for example, a logic "1", to a non-enabling phase in synchronization with the busclk. An active qualifier signal indicates a busclk cycle that is synchronized with the sysclk. Thus, for example, with a ½× timing (i.e. where the sysclk is a ½ multiple of the busclk), the qualifier signal will toggle to the active level every other busclk cycle. This can be seen in FIG. 6, which is an example of a 2.5× clocking mode for sync generator 30. There, the sysclk is operating at a frequency 2.5 times the busclk. The sysclk will be synchronized with the busclk every fifth cycle of the sysclk, as can be seen in FIG. 6. Therefore, the qualifier signal is generated to attain an active level at the "cycle1".

Figure 5:
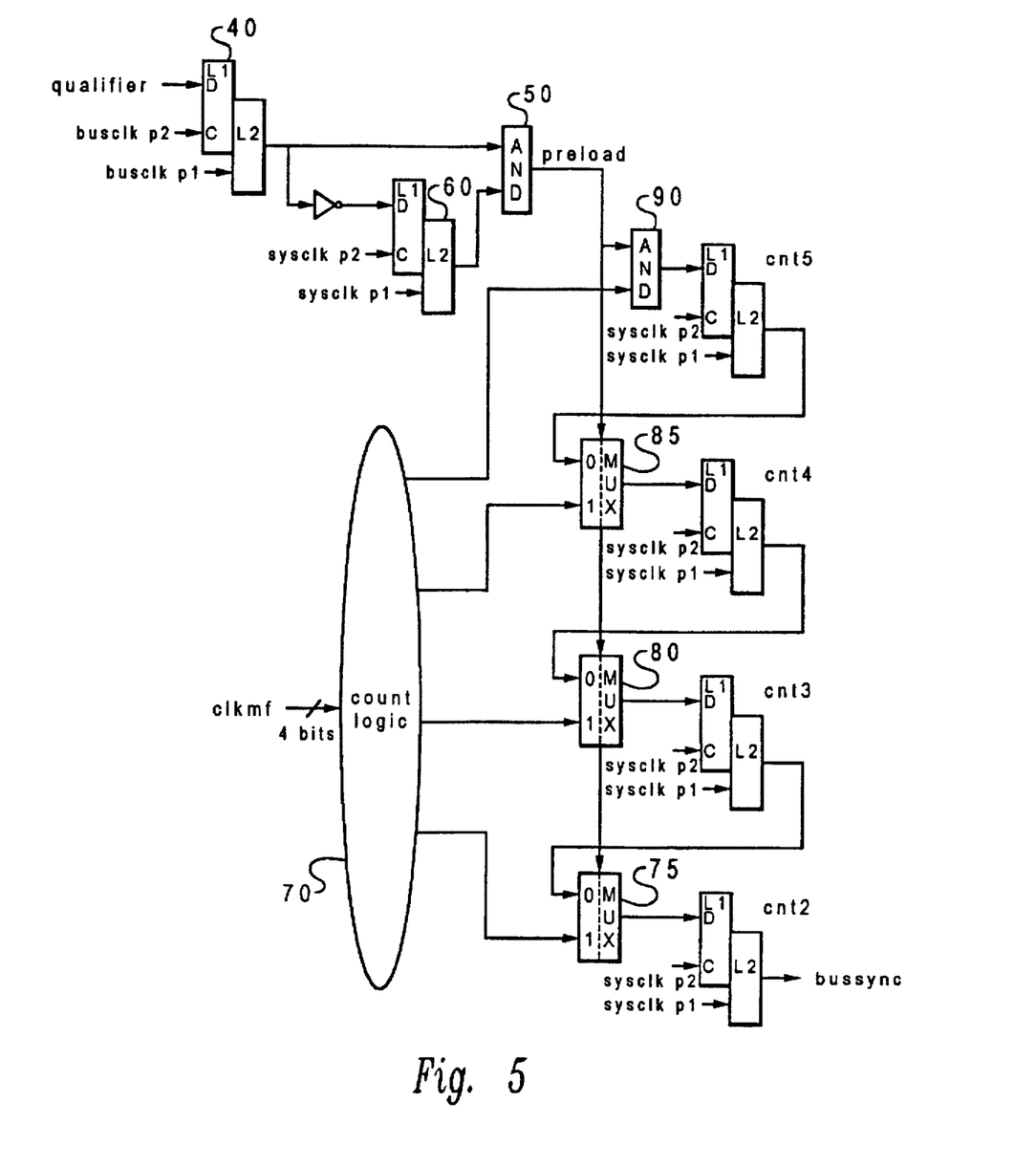
FIG. 5 depicts a preferred embodiment of a sync generator of the present invention.

The operation of sync generator 30 will now be described with reference to FIG. 5, wherein a preferred embodiment of a sync generator of the present invention is shown. To detect when busclk and sysclk are aligned, the qualifier signal from the PLL 10 is latched with busclk in a master-slave latch 40. Master-slave latch 40 includes latches L1 and L2. Latch L1 is clocked by busclk phase 2 (P2) and latch L2 is clocked by busclk phase 1 (P1). The output of master-slave latch 40 is input to ANDgate 50. The output of that latch is also inverted and latched into master-slave latch 60 with sysclk. Master-slave 60 comprises a latch L1 being clocked by sysclk phase 2 (P2) and a latch L2 being clocked by sysclk phase 1 (P1). The output of master-slave latch 60 is also input into ANDgate 50. The output of ANDgate 50 is the "preload signal". The preload signal is the logical AND of the master-slave latches 40 and 60 and produces a one sysclk period pulse, which starts the count to "cycle1" or "cnt1" of the timing.

It can be seen that during the busclk cycles where the qualifier signal is active, an active high signal will be output from the master-slave latch 40 into ANDgate 50. Similarly, the synchronized first cycle ("cycle1") of sysclk will latch the high input to master-slave latch 60 and output an active high signal to ANDGATE 50. These two signals will be ANDed by ANDgate 50 to produce the preload signal, as seen in FIG. 6.

The preload signal indicates the specific cycle that the busclk and sysclk are synchronized, and, in turn, indicates the first cycle of a period within which a selected pattern of bussync signals are generated. Each multiplication frequency has a selected pattern of bussync pulses that properly allow the synchronization of the input data to the non-integer multiple frequency of the internal clock. For the example of the 2.5× clocking mode, the selected pattern of bussync pulses has a period of five sysclk cycles and contains two bussync pulses occurring at cycle three and cycle five.

Referring again to FIG. 5, the selected pattern of bussync pulses is generated by count logic 70, as a function of the clock multiplication frequency (clkmf) input of four bits. The preload signal is used to precondition a serial chain of latches (cnt2-cnt5) clocked with sysclk. Count logic 70 generates a selected pattern of logical zeros and ones that corresponds to the bussync pulse pattern required for the given clock multiplication frequency. A separate bit of the selected pattern is sent to each of multiplexers 75, 80, 85, and ANDgate 90. When a preload signal occurs, the selected pattern will be preloaded into the chain of count latches cnt5-cnt2. (The count latches cnt2-cnt5 correspond to cycle2-cycle5 of FIG. 6.) After the preload cycle (cycle1), the selected pattern is shifted through the latch chain every sysclk cycle. The output of the count latch cnt2 produces the bussync sent to latch circuit 20.

Thus, for the example of 2.5× clocking as shown in FIG. 6, clkmf would indicate a 2.5 multiple to count logic 70. Count logic 70 would output a pattern of bits equal to "0101", producing a zero input to multiplexers 75 and 85 and a "1" signal to multiplexer 80 and ANDgate 90. At the occurrence of a preload signal indicating cycle1 of a new period for the pattern, count latches cnt2-cnt5 are loaded with the pattern. Subsequent cycles of sysclk transfer the bits through multiplexers 75–85 to the next count latches in the serial chain until each bit is output as a bussync pulse at the proper sysclk cycle.

Figure 7:
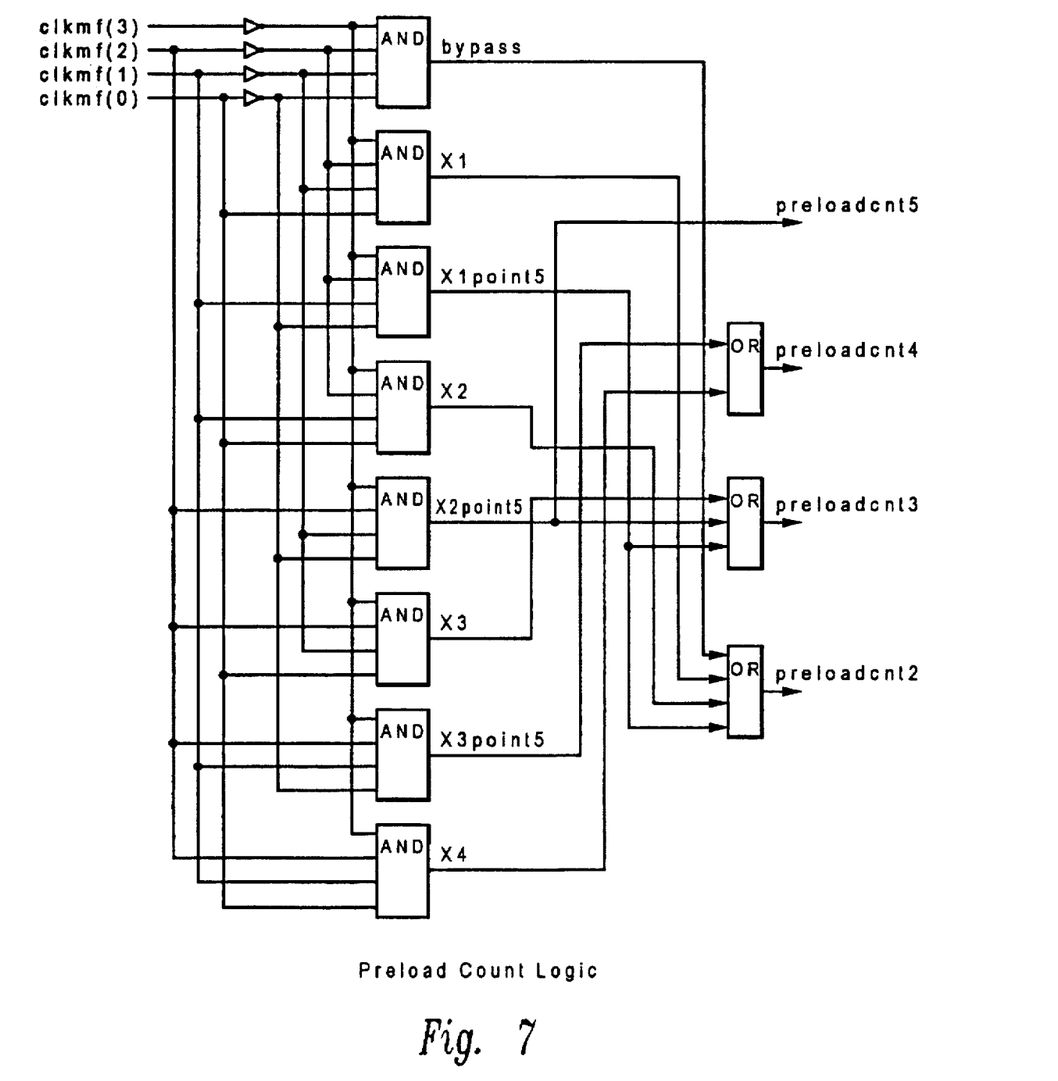
FIG. 7 is a schematic block diagram of count logic 70, according to a preferred embodiment of the present invention.

Referring now to FIG. 7, there is depicted a schematic block diagram of count logic 70, according to a preferred embodiment of the present invention. Here, count logic 70 is designed to provide the selected pattern to four count latches in a clock translator capable of synchronizing ½n× multiple clocks. This circuit will now be described using the VHDL Hardware Description Language, which is well known to those skilled in the art.

```
--preload count decoder. "count logic"
bypass      <=   '1' when (clkmf="0000") or (wdmode ='1') else '0';
x1          <=   '1' when (clkmf="0001") or (wdmode ="1") else '0';
x1point5    <=   '1' when clkmf="0010" else '0';
x2          <=   '1' when clkmf="0011" else '0';
x2point5    <=   '1' when clkmf="0100" else '0';
x3          <=   '1' when clkmf="0101" else '0';
x3point5    <=   '1' when clkmf="0110" else '0';
x4          <=   '1' when clkmf="0111" else '0';
x4point5    <=   '1' when clkmf="1000" else '0';
x5          <=   '1' when clkmf="1001" else '0';
x5point5    <=   '1' when clkmf="1010" else '0';
x6          <=   '1' when clkmf="1011" else '0';
x6point5    <=   '1' when clkmf="1100" else '0';
x7          <=   '1' when clkmf="1101" else '0';
x7point5    <=   '1' when clkmf="1110" else '0';
x8          <=   '1' when clkmf="1111" else '0';
preloadcnt2 <=   bypass or x1 or x1point5    or    x2 ;
preloadcnt3 <=   x1point5      or   x2point5      or   x3 ;
preloadcnt4 <=   x3point5      or   x4 ;
preloadcnt5 <=   x2point5      or   x4point5      or   x5 ;
preloadcnt6 <=   x6 ;
```

-continued

```
preloadcnt7    <=    x7 or x3point5 ;
preloadcnt8    <=    x8 ;
preloadcnt9    <=    x4point5 ;
--bussync counter.
cnt9in <= preloadcnt9 and preload;
CNT9LAT    :    srll port    map(
                              datain      => cnt9in,
                              M_Clock     => PH2,
                              S_Clock     => PH1,
                              Reset       => por,
                              M_Out       => terminate6,
                              S_Out       => syncnt9
                             );
cnt8in <=      preloadcnt8    when preload='1' else
               syncnt9        when preload='0' else
               'X';
CNT8LAT    :    srll port    map(
                              datain      => cnt8in,
                              M_Clock     => PH2,
                              S_Clock     => PH1,
                              Reset       => por,
                              M_Out       => terminate7,
                              S_Out       => syncnt8
                             );
cnt7in <=      preloadcnt7    when preload='1' else
               syncnt8        when preload='0' else
               'X';
CNT7LAT    :    srll port    map(
                              datain      => cnt7in,
                              M_Clock     => PH2,
                              S_Clock     => PH1,
                              Reset       => por,
                              M_Out       => terminate8,
                              S_Out       => syncnt7
                             );
cnt6in <=      preloadcnt6    when preload='1' else
               syncnt7        when preload='0' else
               'X';
CNT6LAT    :    srll port    map(
                              datain      => cnt6in,
                              M_Clock     => PH2,
                              S_Clock     => PH1,
                              Reset       => por,
                              M_Out       => terminate9,
                              S_Out       => syncnt6
                             );
cnt5in <=      preloadcnt5    when preload='1' else
               syncnt6        when preload='0' else
               'X';
CNT5LAT    :    srll port    map(
                              datain      => cnt5in,
                              M_Clock     => PH2,
                              S_Clock     => PH1,
                              Reset       => por,
                              M_Out       => terminate10,
                              S_Out       => syncnt5
                             );
cnt4in <=      preloadcnt4    when preload='1' else
               syncnt5        when preload='0' else
               'X';
CNT4LAT    :    srll port    map(
                              datain      => cnt4in,
                              M_Clock     => PH2,
                              S_Clock     => PH1,
                              Reset       => por,
                              M_Out       => terminate11,
                              S_Out       => syncnt4
                             );
cnt3in <=      preloadcnt3    when preload='1' else
               syncnt4        when preload='0' else
               'X';
CNT3LAT    :    srll port    map(
                              datain      => cnt3in,
                              M_Clock     => PH2,
                              S_Clock     => PH1,
                              Reset       => por,
                              M_Out       => terminate12,
                              S_Out       => syncnt3
                             );
cnt2in <=      preloadcnt2    when preload='1' else
```

```
              syncnt3       when preload='0' else
              'X';
CNT2LAT    :  srll port    map(
                            datain      => cnt2in,
                            M_Clock     => PH2,
                            S_Clock     => PH1,
                            Reset       => por,
                            M_Out       => terminate13,
                            S_Out       => syncnt2
                           );
CNT1LAT    :  srll port    map(
                            datain      => syncnt2,
                            M_Clock     => PH2,
                            S_Clock     => PH1,
                            Reset       => por,
                            M_Out       => terminate14,
                            S_Out       => syncnt1
                           );
bussync <= syncnt2;
acksync <= syncnt1;
```

Referring again to FIG. 6, the count logic 70 is combinational logic used to generate the selected pattern for the serial chain of count latches. It will be appreciated by those skilled in the art that the clock multiplication factors that are input to count logic 70 may be expanded to include additional multiplication factors or even generalized to accommodate other non-integer multiples of clock frequencies. For example, the clock multiples could be 1/3n× or 1/5n× (for instance, 3⅓ or 2⅕).

As has been explained, a selected pattern has a preset value of logic "1" for the cycle count in which a bussync pulse is needed. As will be appreciated by those skilled in the art, the selected pattern for a given multiplication frequency can be determined by count logic 70 by calculating (empirically or mathematically) the sysclk cycle that overlaps a busclk rising edge. To calculate which count latches (cnt(x)) must be loaded with a logic 1 to produce the correct pattern of bussync pulses can be given mathematically as follows:

| preset cnt(x) | = integer (MF × J) + 1 | for J=1 to n−1 |
|---|---|---|
|  | = MF × J | for J=n. | where

MF is the multiplication factor n is the integer fraction example:

MF=2⅔ (two and two thirds)

n=3 (⅓× clocking)

preset cnt for J=1=integer(2⅔×1)+1=3 preset cnt for J=2=integer(2⅔×2)+1=6 preset cnt for J=3=2⅔×=8

Therefore, the count logic will assert cnt3, cnt6, and cnt8 for a non-integer multiple of 2⅔. A truth table describing the pattern for selected multiplication frequencies is given below.

Truth table for example of 1/n × clocking

| MF (clock multiplication frequency) | Preset values | | | | | | | | |
|---|---|---|---|---|---|---|---|---|---|
| | cnt 2 | cnt 3 | cnt 4 | cnt 5 | cnt 6 | cnt 7 | cnt 8 | cnt 9 | cnt 10 |
| integer 1 | 1 | 1 | 1 | 1 | 1 | 1 | 1 | 1 | 1 |
| 2 | 1 | 0 | 0 | 0 | 0 | 0 | 0 | 0 | 0 |
| 3 | 0 | 1 | 0 | 0 | 0 | 0 | 0 | 0 | 0 |
| 4 | 0 | 0 | 1 | 0 | 0 | 0 | 0 | 0 | 0 |
| 5 | 0 | 0 | 0 | 1 | 0 | 0 | 0 | 0 | 0 |
| 6 | 0 | 0 | 0 | 0 | 1 | 0 | 0 | 0 | 0 |
| 7 | 0 | 0 | 0 | 0 | 0 | 1 | 0 | 0 | 0 |
| 8 | 0 | 0 | 0 | 0 | 0 | 0 | 1 | 0 | 0 |
| ½ × 1.5 | 1 | 1 | 0 | 0 | 0 | 0 | 0 | 0 | 0 |
| 2.5 | 0 | 1 | 0 | 1 | 0 | 0 | 0 | 0 | 0 |
| 3.5 | 0 | 0 | 1 | 0 | 1 | 0 | 0 | 0 | 0 |
| 4.5 | 0 | 0 | 0 | 1 | 0 | 0 | 1 | 0 | 0 |
| ⅓ × 1⅓ | 1 | 1 | 1 | 0 | 0 | 0 | 0 | 0 | 0 |
| 1⅔ | 1 | 0 | 1 | 1 | 0 | 0 | 0 | 0 | 0 |
| 2⅓ | 1 | 0 | 1 | 0 | 1 | 0 | 0 | 0 | 0 |
| 2⅔ | 0 | 1 | 0 | 0 | 1 | 0 | 1 | 0 | 0 |
| ¼ × 1¼ | 1 | 1 | 1 | 1 | 0 | 0 | 0 | 0 | 0 |
| 1¾ | 1 | 0 | 1 | 0 | 0 | 1 | 0 | 0 | 0 |
| 2¼ | 0 | 1 | 0 | 1 | 0 | 1 | 0 | 1 | 0 |
| ⅕ × 1⅕ | 1 | 1 | 1 | 1 | 1 | 0 | 0 | 0 | 0 |
| 1⅖ | 1 | 1 | 0 | 1 | 1 | 1 | 0 | 0 | 0 |
| 1⅗ | 1 | 0 | 1 | 1 | 0 | 1 | 1 | 0 | 0 |

It can be seen from the above table that the selected pattern covers a period of cycles of the internal clock and that the pattern repeats every period. This period has a number of cycles L of the internal clock, wherein:

$$L = (n) \times (MF)$$

where, n is an integer fraction

MF is the non-integer multiple (i.e. the multiplication frequency).

To generalize the present invention for 1/n× multiple timing, PLL 10 and latch circuit 20, as described in the preferred embodiment, remain unchanged. Sync generator 30, however, must be designed to accommodate 1/n multiple clocking. The same criteria as described in the preferred embodiment still apply. busclk and sysclk must be synchronized clocks (i.e. having an "in-phase" condition when both busclk and sysclk have rising edges), and busclk's falling edge must always occur later than the next sysclk rising edge. For the generalized case, count logic 70 would be designed to produce the appropriate pattern for the multiple frequency of sysclk, as described above. In addition, the number of latches required in sync generator 30 is also a function of the non-integer multiple frequency of sysclk. The number of latches required is calculated as follows:

$$\text{number-latches} = (n) \times (MF)$$

where,

MF is the multiplication factor (non-integer multiple).

n is the integer fraction.

Two examples are given below.

EXAMPLE 1

MF=1¼ (one and one quarter)

n=4(¼× clocking) #latches=4×1¼=5.

EXAMPLE 2

MF=5⅔ (five and two thirds)

n=3 (⅓× clocking) #latches=3×5⅔=17.

As used herein, the multiplication factor (MF) is equal to the ratio of the internal clock frequency to the external clock frequency. The multiplication factor may be an integer multiple or a non-integer multiple, according to the present invention. Also, as used herein, the integer fraction (n) is the fractional remainder of a non-integer multiple internal clock frequency (i.e., the fractional remainder of a non-integer multiplication frequency). For example, for a non-integer multiple of 2½, MF=2.5 and n=2.

While the invention has been particularly shown and described with reference to a preferred embodiment, it will be understood by those skilled in the art that various changes in form and detail may be made therein without departing from the spirit and scope of the invention.

What is claimed is:

1. A method of synchronizing data from an external clock frequency of an external clock to an internal clock frequency of an internal clock of an apparatus that is a non-integer multiple of the external clock frequency, the method comprising the steps of:

generating a series of sync pulses in a selected pattern, wherein the pattern is a function of the non-integer multiple;

latching synchronous data in the apparatus that is received at the external frequency; and outputting the latched synchronous data from the apparatus in synchronization with the internal frequency, in response to the series of sync pulses.

2. A method of synchronizing data from an external clock frequency of an external clock to an internal clock frequency of an internal clock of an apparatus that is a non-integer multiple of the external clock frequency according to claim 1, wherein the selected pattern has a period of L number of cycles of the internal clock, wherein:

$$L = (n) \times (MF);$$

where, n is an integer fraction

MF is the non-integer multiple.

3. A method of synchronizing data from an external clock frequency of an external clock to an internal clock frequency of an internal clock of an apparatus that is a non-integer multiple of the external clock frequency according to claim 1, wherein the pattern is selected so a sync pulse occurs at each cycle C of the internal clock occurring after a first phase of the internal clock is synchronized with a first phase of the external clock, wherein:

| C | | |
|---|---|---|
| | = integer (MF × J) + 1, | for J=1 to n−1 |
| | = MF × J, | for J=n, | wherein n is an integer fraction

MF is the non-integer multiple.

4. A method of synchronizing data from an external clock frequency of an external clock to an internal clock frequency of an internal clock of an apparatus that is a non-integer multiple of the external clock frequency according to claim 3, wherein MF=2.5 and n=2.

5. A method of synchronizing data from an external clock frequency of an external clock to an internal clock frequency of an internal clock of an apparatus that is a non-integer multiple of the external clock frequency according to claim 3, wherein the predetermined pattern has a period of L number of cycles of the internal clock, wherein;

$$L = (n) \times (MF);$$

where, n is an integer fraction

MF is the non-integer multiple.

6. A method of synchronizing data from an external clock frequency of an external clock to an internal clock frequency of an internal clock of an apparatus that is a non-integer multiple of the external clock frequency according to claim 5, wherein MF=2.5 and n=2.

7. A method of synchronizing data from an external clock frequency of an external clock to an internal clock frequency of an internal clock of an apparatus, wherein the external clock frequency is a non-integer multiple of the internal clock frequency, the method comprising the steps of:

latching data received by the apparatus in a first latch during an enabling phase of an external clock;

generating a sync signal having an enabling phase, wherein the enabling phase of the sync signal is generated during a period beginning at or before the end of the enabling phase of the external clock and ending at or after the next succeeding end of an enabling phase of the internal clock to occur;

latching the data latched in the first latch into a second latch during a period that the enabling phase of the internal clock and the enabling phase of the sync signal are contemporaneous; and outputting the latched data in the second latch from the apparatus at the frequency of the internal clock.

8. A method of synchronizing data from an external clock frequency of an external clock to an internal clock frequency of an internal clock of an apparatus according to claim 7, wherein the end of the enabling phase of the external clock is not contemporaneous with the end of the next succeeding enabling phase of the internal clock to occur.

9. A multiple clock translator for synchronizing data from an external clock speed of an external clock to an internal clock speed of an internal clock of the multiple clock translator, wherein the internal clock speed is a non-integer multiple of the external clock speed, the translator comprising:

a latch circuit that receives data at the external clock speed and outputs data at the internal clock speed having an input latch and a sync latch, the latch circuit receiving an enabling phase of the external clock and an enabling phase of the internal clock, wherein the input latch is clocked by the enabling phase of the external clock, and the sync latch is clocked by the enabling phase of the internal clock and is enabled by a sync pulse; and a synchronization signal generator that generates a series of sync pulses that are output to the latch circuit in a selected pattern, wherein the pattern is a function of the non-integer multiple.

10. A multiple clock translator for synchronizing data from an external clock speed of an external clock to an internal clock speed of an internal clock of the multiple clock translator according to claim 9, wherein the sync signal generator includes L number of latches connected in a series and wherein the latches are loaded with the selected pattern after every L cycles of the internal clock, the latches being clocked by the internal clock and outputting the series of sync pulses from the last latch in the series of latches, wherein;

$$L=(n)\times(MF);$$

where, n is an integer fraction

MF is the non-integer multiple.

11. A multiple clock translator for synchronizing data from an external clock speed of an external clock to an internal clock speed of an internal clock of the multiple clock translator according to claim 9, wherein the pattern is selected so a sync pulse occurs at each C(X) cycle of the internal clock occurring after an enabling phase of the internal clock is synchronized with an enabling phase of the external clock, wherein;

| X | = integer (MF × J) + 1, | for J=1 to n−1 |
|---|---|---|
|   | = MF × J, | for J=n, | where, n is an integer fraction

MF is the non-integer multiple.

12. A multiple clock translator for synchronizing data from an external clock speed of an external clock to an internal clock speed of an internal clock of the multiple clock translator according to claim 9, wherein the internal clock has a non-enabling phase, and further wherein the sync latch is a master-slave latch device having a slave latch and a master latch input into the slave latch, the master latch being clocked by the enabling phase of the internal clock and the slave latch being clocked by the non-enabling phase of the internal clock.

* * * * *

UNITED STATES PATENT AND TRADEMARK OFFICE
CERTIFICATE OF CORRECTION

PATENT NO. : 5,634,116
DATED : May 27, 1997
INVENTOR(S) : Singer

It is certified that error appears in the above-indentified patent and that said Letters Patent is hereby corrected as shown below:

Column 9, line 63: insert --3-- after "2 2/3 x"

Signed and Sealed this

Nineteenth Day of August, 1997

*Attest:*

*Attesting Officer*

BRUCE LEHMAN

*Commissioner of Patents and Trademarks*